(12) United States Patent
Tsiatsikas (10) Patent No.: US 12,284,297 B2
(45) Date of Patent: Apr. 22, 2025

(54) METHOD AND SYSTEM FOR BLOCKCHAIN-DRIVEN COMMUNICATION USING ENCAPSULATED VIRTUAL CHAINS

(71) Applicant: ATOS Public Safety, LLC, Irving, TX (US)

(72) Inventor: Zisis Tsiatsikas, Salonika (GR)

(73) Assignee: ATOS PUBLIC SAFETY, LLC., Irving, TX (US)

( * ) Notice: Subject to any disclaimer, the term of this patent is extended or adjusted under 35 U.S.C. 154(b) by 213 days.

(21) Appl. No.: 18/078,553

(22) Filed: Dec. 9, 2022

(65) Prior Publication Data

US 2023/0224175 A1    Jul. 13, 2023

(30) Foreign Application Priority Data

Jan. 13, 2022   (EP) .................................. 22 151 386

(51) Int. Cl.
*H04L 9/00* (2022.01)
*H04L 9/32* (2006.01)
*H04W 4/90* (2018.01)

(52) U.S. Cl.
CPC .............. *H04L 9/50* (2022.05); *H04L 9/3221* (2013.01); *H04W 4/90* (2018.02); *H04L 2209/463* (2013.01)

(58) Field of Classification Search
CPC ........... H04L 9/50; H04L 9/3221; H04W 4/90
See application file for complete search history.

(56) References Cited

U.S. PATENT DOCUMENTS

| 2020/0134760 A1 | 4/2020 | Messerges et al. |
| 2020/0296111 A1* | 9/2020 | Karame ................ H04L 9/3239 |
| 2021/0044420 A1* | 2/2021 | Lee ......................... G06Q 20/02 |

FOREIGN PATENT DOCUMENTS

GB           2577751 A       4/2020

OTHER PUBLICATIONS

Extended European Search Report for European Application No. 22151386.4 dated Jun. 24, 2022.
"Practical Byzantine Fault Tolerance and Proactive Recovery" by Miguel Castro and Barbara Liskov, ACM Transactions on Computer Systems, vol. 20, No. 4, Nov. 2002, pp. 398-461.

* cited by examiner

*Primary Examiner* — Clayton R Williams
(74) *Attorney, Agent, or Firm* — MEAGHER EMANUEL LAKS GOLDBERG & LIAO, LLP (57) ABSTRACT

A method and system for blockchain-driven communication using encapsulated virtual chains can facilitate blockchain-driven inter-PSAP communication using encapsulated virtual chains. Embodiments can be generalized for any context (e.g. not only for the specific examples of the Next Generation 9-1-1 and 1-1-2 (NG9-1-1/NG1-1-2) architectures).

14 Claims, 5 Drawing Sheets

METHOD AND SYSTEM FOR BLOCKCHAIN-DRIVEN COMMUNICATION USING ENCAPSULATED VIRTUAL CHAINS

CROSS-REFERENCE TO RELATED APPLICATIONS

The present application claims priority to European Patent Application No. EP 22 151 386.4, filed on Jan. 13, 2022. The entirety of this European Patent application is incorporated by reference herein.

FIELD

The present invention relates to a method and system for blockchain-driven communication using encapsulated virtual chains. In detail, the present invention relates also to a method for blockchain-driven inter-PSAP communication using encapsulated virtual chains. However, the present invention can be generalized for any context, not only for specific examples of the Next Generation 9-1-1 and 1-1-2 (NG9-1-1/NG1-1-2) architectures.

BACKGROUND

In network systems of facilities or entities that are part of the critical infrastructure of a region, a state or a country, there is a high interest in keeping them running even in times of crisis, extreme large-scale disasters, or other events that can stress such networks.

Critical infrastructure is a term used by governments to describe assets that are essential for the functionality of a society and economy—the infrastructure. Most commonly associated with this term are facilities for shelter, heating (e.g. natural gas, fuel oil, district heating), agriculture, food production and distribution, water supply (e.g. drinking water, waste water/sewage, stemming of surface water (e.g. dikes and sluices), public health (e.g. emergencies, hospitals, ambulances), transportation systems (e.g. fuel supply, railway network, airports, harbors, inland shipping), security services (e.g. police, military), electricity generation, transmission and distribution (e.g. natural gas, fuel oil, coal, nuclear power), renewable energy which is naturally replenished on a human timescale such as sunlight, wind, rain, tides, waves and geothermal heat, telecommunication (e.g. coordination for successful operations). Further, the business or economic sector as well as goods and services and financial services (e.g. banking, clearing) may also be affected by such crises.

SUMMARY

I determined that, such facilities and, above all, their networks must not only operate stably and reliably in a crisis situation, but must also observe certain legal, infrastructural or other rules. Mostly or primarily, government organizations or surveillance are directly connected to these institutions or are in close contact with them. Another important point is that information in such networks can be found reliably and promptly in order to provide an appropriate response in crisis situations.

For Example, in emergency ecosystems like NG9-1-1 or NG1-1-2, such systems suffer from inter-connectivity and information sharing issues across different jurisdictions. This happens because a common Database (DB) that can store inter-Public Safety Answering Point (PSAP) information, regarding incident handling, does not exist. The issue becomes even more critical when two or more Public Safety Answering Point (PSAP) elements which do not belong to the same jurisdiction receive an emergency request with regards to the same incident. The indication could be related to an emergency call, an abandoned call, or even multiple calls for the same incident, which are routed on different PSAP elements, say due to Policy-based Routing Function (PRF) rules. PRF (Policy-based Routing Function) is a functional component of an Emergency Service Routing Proxy (ESRP) that determines the next hop in, for example, a SIP signaling path using a Policy Routing Rule.

Moreover, even if such a mechanism could be in place, a common way to sync the information and preserve the clarity across all PSAPs would be very difficult. This happens mostly due to the fact that all the PSAP elements do not rely on the same vendor. Thus, a unique framework would be beneficial in order to offer a mechanism that will share information among the different PSAP elements regarding incidents.

So far different solutions have appeared to tackle sharing information issues on the Emergency Services IP Network (ESInet). The ESInet is a managed IP network that is used for emergency services communications, and which can be shared by all public safety agencies. It provides the IP transport infrastructure upon which independent application platforms and core services can be deployed, including, but not restricted to, those necessary for providing NG9-1-1 services. ESInets may be constructed from a mix of dedicated and shared facilities. ESInets may be interconnected at local, regional, state, federal, national and international levels to form an IP-based inter-network (network of networks). The term ESInet designates the network, not the services that ride on the network.

However, the aforementioned problem creates different issues, because there are many occasions where calls may be misrouted or abandoned in totally different jurisdictions than those that should handle them at the first place. This happens because the IP environment is prone to routing issues, especially when the calls come from wireless devices. Thus, in these cases the callTakers or agents in the PSAPs do not have any chance to be informed that they may handle similar incidents, or even the same.

A common scenario is related to the initiation of two similar calls which refer to the same incident and are finally routed on different PSAP elements, say due to PRF rules. If the agents on the PSAP side were aware for similar calls in other PSAP elements, in different jurisdictions, they could communicate with each other in such a way that they could organize the incident handling and the unit sharing. Generally, the multitasking processing on events on the PSAP side is something very common for the agents. The problem mentioned is also present in other areas outside of emergency response scenarios. However, especially in the area of critical infrastructure but also in economics, it is crucial not to waste time and resources unnecessarily due to the ignorance of parallel handled identical events or tasks.

Blockchain is suitable for keeping information preserved and trustworthy. However, for blockchain systems that are used within an emergency response system or a critical infrastructure system, it is essential that such systems are both trustworthy and fast. This is not possible with the systems or methods currently available, or only with considerable cost and resource investment.

Embodiments of the present invention can be based on the object to provide a method and a corresponding system for blockchain-driven communication using encapsulated virtual chains. For instance, embodiments of a method and a system is provided, which can prevent the unnecessary handling of parallel identical or context related events or tasks in systems, especially in emergency systems.

A method for blockchain-driven communication using encapsulated virtual chains is provided, the method comprising the steps of:
- determining, by the consensus scheme, a node as a leader node, which is able to create a new block within a specific predetermined time period t;
- performing, by the leader node, a search in the blockchain to find a transaction in a block with similar context to those present at the leader node;
- retrieving, by the leader node, the transactions found in the search;
- performing, by the leader node, an analysis of the retrieved transactions to identify possible capacity needs for future tasks related to this context and/or their distribution among neighbor nodes; and
- checking, by the leader node, if new local context is present at the leader node, and, in case no new local context is found, ending the block creation process of the leader node and proceeding the method with a new leader node.

In the sense of the invention, the search can also be adapted, e.g. in such a way that a specific context is searched for in a specific radius x on a specific map. Furthermore, parameters such as time, priority level, etc. can be queried.

According to a preferred embodiment, wherein, in case new local context is found by the leader node, the method further comprising:
- correlating, by the leader node, the new local context with that context analyzed in the previous step;
- creating, by the leader node, a new block comprising the new local context together with the correlations of existing blocks retrieved in the search step;
- sending, by the leader node, the created block to the other nodes of the blockchain for validation;
- checking, by each of the other nodes of the blockchain, if the created block comprises context which is similar to that which is handled by one of the other nodes of the blockchain;
- validating, by the other nodes, the created block and adding the created block to the blockchain, in case there is no similar context present among the other nodes of the blockchain; and
- sending, by the leader node, a notification about the validation result to the other nodes and ending method.

The correlation between existing and new blocks based on context creates new so-called virtual chains. By linking these virtual chains in a new mining round, again based on context, thus a large number of virtual chains can be created which exist alongside the actual blockchain. Special analyses, e.g. of the capacity of various parameters of the nodes, can thus be carried out more efficiently and in a shorter time with less effort. Tasks or other events that would otherwise be processed or executed in parallel can also be uncovered and bundled or effectively assigned to one unit.

According to another preferred embodiment, wherein in case there is similar context present among at least one of the other nodes of the blockchain, the method further comprising:
- sending, by the at least one other node of the blockchain which exhibits similar context, a negative validation result to the leader node, in case this correlation was not added to the created block; and
- receiving, by the leader node, the negative validation result and reshaping, by the leader node, the created block to comprise also the correlation between the blocks, then continuing the method at sending, by the leader node, the created block to the other nodes of the blockchain for validation.

According to still another preferred embodiment, wherein in case similar context is found and the correlation has been added in the created block, the method further comprising;
- comparing, by the leader node the states of the similar context;
- alerting, by the leader node the nodes of similar context, for similarity in context;
- initializing, by the leader node, a communication between the nodes of similar context;
- exchanging, by the nodes of similar context, information regarding context handling;
- validating, by the other nodes, the created block and adding the created block to the blockchain, if the validation result is positive; and
- sending, by the leader node, a notification about the validation result to the other nodes and ending method.

Further, according to a preferred embodiment, the node and/or the leader node of the blockchain is one or more of a Public Safety Answering Point element, PSAP, a computer, a server, an element of an entity of critical infrastructure.

According to yet another preferred embodiment, the context is any piece of information related to an incident, an image, a video, a sound, a geolocation and/or any other pieces of data.

According to yet another preferred embodiment, wherein if one or more of the neighbor nodes receives many transactions, the method further comprising performing, by the leader node, a resource check with respect to the capacity, and/or preparing the resources needed on a primary, a secondary PSAP, and/or on a first responders end. while a primary PSAP is defined as a PSAP element which first receives the emergency call, routed by the ESRP and a secondary PSAP is defined as a PSAP element which receives a transferred call from a primary PSAP.

According to yet another preferred embodiment, wherein in case the communication is not possible between the nodes of similar context, the method further comprising marking, by the leader node and/or any other node or validator, the similar context automatically as related. Further, both the leader node and any other node or validator which may have similar context transactions may keep the related context in a buffer so that they can add it in the next mining round.

According to yet another preferred embodiment, wherein the blockchain is a Public blockchain, a Private blockchain, a Consortium blockchain or a hybrid blockchain.

According to yet another preferred embodiment, wherein the predetermined time period t is 30 seconds preferred 22 seconds or especially preferred 15 seconds. However, it is understood that the predetermined time period has to be adapted to the conditions which are present so that the time period can also be shorter or even longer.

According to the invention, a system for blockchain-driven communication using encapsulated virtual chains is provided, wherein the system is configured to perform the method according to any of the claims 1 to 10.

According to a preferred embodiment, the system comprises:
- one or more nodes connected to each other within the blockchain system,
- one or more transactions,
- one or more block, capable of keeping a set of transactions which is distributed to all nodes in the network,
- a chain of blocks in a specific order, one or more virtual chain which are chained by their context and are encapsulated in the chain,
a leader node or miner capable to perform the block generating process,
one or more consensus algorithms,
one or more validator nodes
a blockchain ecosystem.

A blockchain ecosystem can constitute a service overlay network and to be a node in the network, a computer must be able to process application-specific messages, must comply with the rules of the network and/or applied consensus and affect the shared state of the network. Such an ecosystem may comprise a systems management which provides the ability to create, change and monitor blockchain components. A consensus algorithm is a set of rules and arrangements to carry out blockchain operations. A transaction is the smallest building data block of the blockchain system.

According to another preferred embodiment, the system comprises a Master Node. Selective blockchain networks often have master nodes. Master nodes are more capable than normal nodes. They are in an active mode (24 hours/7 days). Master nodes facilitate voting events and foresee other events in a blockchain network. These nodes take up more memory than the normal nodes; their main task is to maintain an equilibrium between the blocks.

According to still another preferred embodiment, the consensus algorithms is one or more of proof of authority (PoAuth), proof of stake (PoS), delegated proof of stake (DPoS), leased proof of stake (LPoS), proof of elapsed time (PoET), practical Byzantine fault tolerance (PBFT), simplified Byzantine fault tolerance (SBFT), delegated Byzantine fault tolerance (DBFT), directed acyclic graphs (DAG), proof of activity (PoA), proof of importance (PoI), proof of capacity (PoC), proof of burn (PoB), multi-signature and/or proof of weight (PoWeight).

In the direction of achieving a fast block creation, the avoidance of a proof of work (PoW) consensus algorithm is considered a sine qua non. Especially in the case of a permissioned blockchain, e.g. a private blockchain that is not public but that is only shared among specific entities (e.g., among PSAP elements), it is considered mandatory to avoid PoW. For this reason, in the context of this proposal, we consider that the nodes operate using the proof of authority (PoAuth) consensus algorithm.

In PoAuth, rights to generate new blocks are awarded to nodes that have proven their authority to do so. These nodes run software allowing them to put transactions in block. PoAuth is suited for both private networks and public networks, where trust is distributed. The PoAuth consensus algorithm leverages value of identities, which means that block validators are not staking coins but their own reputation instead. PoAuth is secured by trust on the identities selected. The PoAuth algorithm offers an increased rate of block creation. All nodes in the blockchain are given a specific interval on which they become the leader nodes and it is possible to generate new blocks. However, any other similar consensus algorithm can be exploited for the same reason.

In Proof of Stake (PoS) blockchain consensus models transactions are secured by users of the blockchain network who play the role of validators. To validate transactions, validators must hold a certain percentage of the network's total value. This concept leads to reduced usage of system & hardware resources. Proof of stake might also provide increased protection from malicious attacks on the network by making it very expensive to execute attacks, and, therefore, reducing the incentive for those attacks.

While PoW and PoS consensus are used in the majority of today's blockchain networks, there are also many other models of the consensus mechanism having the same ultimate goal—maintain the security and operation of a decentralized platform and allow blockchain users to come to an agreement in block creation. Below are just a few of the modern implementations of decentralized consensus:

Delegated Proof Of Stake (DPoS): DPoS is a high-speed consensus model, most known for its first implementation in EOS blockchain. Delegated Proof of Stake mechanism is a type of consensus where users can stake their coins to participate in voting for a number of delegates. The weight of a user's vote depends on the stake. Delegates that have received the highest amount of votes are allowed to take part in block creation and get rewarded for creating these blocks.

Multi-signature (Multisig): Multisig is a model where the majority of validators on the blockchain network (for instance, 7 out of 10) must agree that a transaction is valid.

Proof Of Capacity (PoC): PoC is a model where consensus is achieved via a process called plotting. Instead of using computational power to create solutions, they are pre-stored in digital storages. The owner of the fastest solution to the puzzle gets to create the new block. Users who have the most storage capacity on the blockchain have the highest odds of creating a new block.

Practical Byzantine Fault Tolerance (PBFT): PBFT is an algorithm designed to settle disputes among computing nodes (blockchain network participants) when one node in a set of nodes generates different output from the others in the set.

There are also blockchains with pluggable consensus, which means they can incorporate various consensus mechanisms depending on the goals that need to be achieved. In the sense of the invention, it is also possible to use a hybrid consensus, e.g. two or more consensus that run in parallel and can even influence each other.

By incorporating the blockchain architecture, each node will need to report in every mining round the new context which are handled by this node. All the other nodes will remain updated about the context which are handled by each node. By using virtual chains, it is possible to create links between the different context which may not be positioned in adjacent blocks. The invention offers a model that can be used for example in emergency context as well as in any other context. In essence, multiple other embedded context-based chains are formed using only one existing blockchain.

According to yet another aspect of the present invention, a program element is provided, which, when being executed by a processor, is adapted to carry out steps of the method for blockchain-driven communication using encapsulated virtual chains.

According to another aspect of the present invention, a computer-readable medium comprising program code is provided, which, when being executed by a processor, is adapted to carry out steps of the method for blockchain-driven communication using encapsulated virtual chains.

A non-transitory computer-readable medium may be a floppy disk, a hard disk, an USB (Universal Serial Bus) storage device, a RAM (Random Access Memory), a ROM (read only memory) or an EPROM (Erasable Programmable Read Only Memory). A computer readable medium may also be a data communication network, e.g. the Internet, which may allow downloading a program code.

It has also to be noted that aspects of the invention have been described with reference to different subject-matters. In particular, some aspects or embodiments have been described with reference to apparatus type claims, whereas other aspects have been described with reference to method type claims. However, a person skilled in the art will gather from the above and the following description that, unless otherwise notified, in addition to any combination between features belonging to one type of subject-matter also any combination between features relating to different types of subject-matters is considered to be disclosed with this text. In particular, combinations between features relating to the apparatus type claims and features relating to the method type claims are considered to be disclosed. The invention and embodiments thereof will be described below in further detail in connection with the drawing(s).

Other details, objects, and advantages of the telecommunications apparatus, system, device, non-transitory computer readable medium, and method will become apparent as the following description of certain exemplary embodiments thereof proceeds.

BRIEF DESCRIPTION OF THE DRAWINGS

The invention and embodiments thereof will be described below in further detail in connection with the drawings. It should be appreciated that like reference numbers can identify similar components.

Reference numerals used in the drawings include:

S1-S15, which are Steps S1-S15 of the below discussed exemplary embodiments of methods.

DETAILED DESCRIPTION

Embodiments of the invention will now be described in detail on the basis of emergency networks in the below discussion of exemplary embodiments. However, as mentioned above, the invention is not limited to emergency network applications, but can be used in almost any network.

Figure 1:
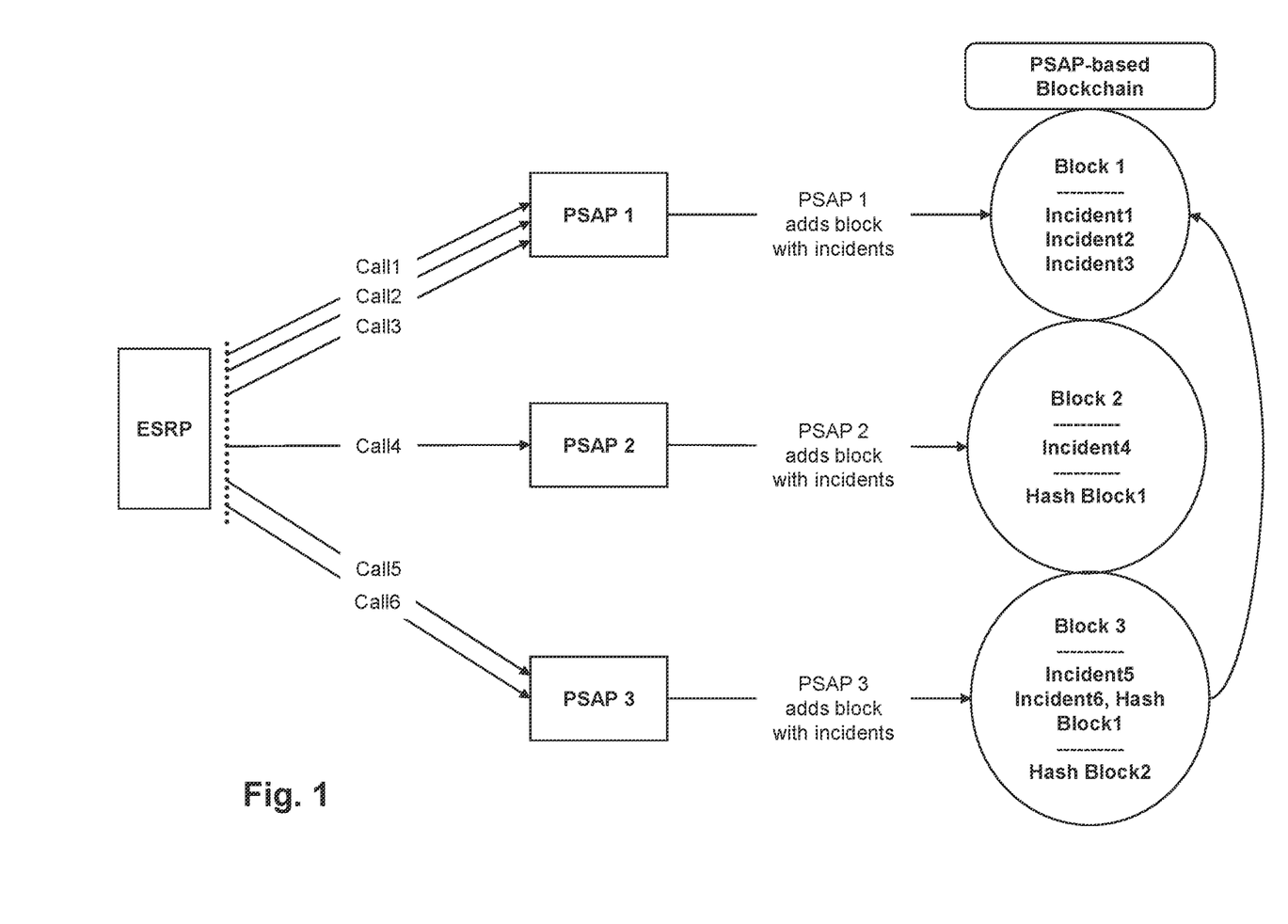
FIG. 1 shows in a schematic illustration an overview of the method for blockchain-driven communication using encapsulated virtual chains on the example of a typical NG911 architecture according to an embodiment of the invention.

FIG. 1 schematically shows an overview of the architecture of the present method on the example of a typical NG911 architecture. Here, the Emergency Services Routing Proxy (ESRP) routes an emergency call to a Public Safety Answering Point (PSAP) element. Embodiments of present invention can be configured to focus on the incorporation of a blockchain architecture in the Emergency Services IP Network (ESInet). Usually, each PSAP element corresponds to a blockchain node that can generate blocks. According to this embodiment, only a leader node, in this example the primary PSAP, can generate blocks at a certain time interval t, but this could be extended accordingly.

Each PSAP element can generate blocks on the blockchain that will comprise the incidents, as context, which are handled by the specific PSAP. In this way, each PSAP can incorporate on a block pieces of information that will later be distributed to the rest of the blockchain nodes, say the other PSAP elements. These other nodes will finally evaluate if they currently handle similar incidents. Following this approach, a fast and easy way to correlate similar calls which are handled on different PSAP elements is established. And this is done only by incorporating the blockchain architecture and exploiting the consensus mechanism.

Furthermore, by using this approach it is easy for any PSAP element to query the blockchain and identify if other PSAP elements handle similar incidents etc. This way, the agents of the PSAPs can contact (e.g., by private line, or in a different way) very fast the PSAP elements which need to be contacted in order to organize their work, share information and in general handle efficient the emergency incidents.

The prior art does not consider the concept of correlation between incidents taking place between the miner and the validator nodes to identify similar incidents.

However, by using embodiments of the present method it can be possible to create links between the different incidents which may not be positioned in adjacent blocks.

In the direction of achieving a fast block creation, the avoidance of a proof of work (PoW) consensus algorithm is considered a sine qua non. Especially in the case of a permissioned blockchain, e.g. a blockchain that is not public but that is only shared among specific entities (e.g., among PSAP elements), it is considered mandatory to avoid PoW. For this reason, in the context of this invention, it is considered that the nodes operate using the proof of authority (PoAuth) consensus algorithm. Still, any other similar algorithm could be also used.

The PoAuth algorithm offers an increased rate of block creation. All nodes in the blockchain are given a specific interval on which they become the leader nodes and it is possible to generate new blocks. However, any other similar consensus algorithm can be exploited for the same reason.

In the context of this invention, it is considered that only the primary PSAP elements act as block generators and validators. Based on the blockchain architecture in general, each one of the nodes at any time possesses a copy of the blockchain ledger. Additionally, it is assumed that each block contains incidents which either wait on the queue or have been assigned to agents of a PSAP. Additionally, a block includes the incident-call state, the geolocation and relation to other blocks of the ledger. This last characteristic is totally different to the classic hash value of every block which points to the previous block.

Say for example a ledger comprises 5 blocks. The classic rules of the blockchain instructs that except from the transactions which are included on the block, the latter will also carry the hash value of the previous block and so on. This happens in order to preserve the integrity across the chain and to avoid tampering of transactions that have been performed in the past. According to the present invention, it is considered that each transaction may be related to transactions from different blocks. Using this non-obvious approach, a new term, namely the virtual chain, was created, which pertains to chains which are actually hidden or better encapsulated on the original chain. When saying hidden, it is not mean from the confidentiality perspective, but from the point of view that a number of different chains using only one blockchain may be present. The way to do that is to link separate blocks based on the context of the incidents.

Thus, for example, block 1 may be related to block 5, due to the fact that they refer to the same incident. Still, the blocks which are in the middle, say blocks 2-4, are not related to this context-incident. Thus, using a chain of 5 blocks, there are also one more encapsulated, comprised of 2 blocks, without the need to preserve a separate copy of this two-item block chain, only by using the context of the transactions as the bond between the blocks. In order to preserve the clarity across the blockchain, the related transactions in non-adjacent blocks will carry also the hash value of the block which is related to them. This way, one can exploit a virtual chain in order to traverse the blockchain really fast, only using the context as the ingredient for the virtual chain. The latter is used as a means to jump between relevant blocks, using only one main blockchain. One more non-obvious characteristic of the invention at hand pertains to the fact that in every mining round, say at round N, the miner adds a relation to other blocks that will follow up. FIG. 1 offers an abstract overview of an example of NG911-architecture. Even in this figure, the blockchain has one ledger across the different nodes. In a typical architecture, each node has a different copy of the ledger locally. However, this approach can be generalized for any context, not only for the specific example of the NG911-architecture.

It should be appreciated that each PSAP or PSAP element can be a type of telecommunication device that can include a processor connected to non-transitory computer readable medium (e.g. a non-transitory memory) and at least one transceiver unit. The PSAP and/or PSAP element can also include at least one input device, at least one output device and/or at least one input/output device. Examples of such devices can include touch screens, printers, keyboards, buttons, or pointer devices. The PSAP and/or PSAP element can also each be configured to form communicative connections with other devices (e.g. agent computer devices, cloud service devices, the ESRP, etc.) and the PSAP and/or PSAP element can also be communicatively connectable (e.g. via a network connection, an internet connection, etc.). For example, in some embodiments, the PSAP can directly control and manage a call queue and in other situations the PSAP can be communicatively connected to a call server that may control and manage a call queue.

It should also be appreciated that an ESRP can be a computer device that includes a processor connected to non-transitory computer readable medium (e.g. a non-transitory memory) and at least one transceiver unit. The ESRP can also include at least one input device, at least one output device and/or at least one input/output device. Examples of such devices can include touch screens, printers, keyboards, buttons, or pointer devices. The ESRP can also be configured to form communicative connections with other devices (e.g. agent computer devices, cloud service devices, the PSAP, a cloud server, etc.). For instance, the ESRP can be communicatively connectable to one or more PSAPs and/or other ESInet elements via a network connection, an internet connection, etc.

As it has been already mentioned, based on the consensus algorithm, each node in the blockchain network becomes the leader node in a specific interval. This means that the leader node can mine/generate a new block only at this specific interval.

This is the period on which the present method operates. It is assumed that the rest of the nodes in this period remain just validators. In case of a typical NG911-architecture, all the PSAP nodes are considered as validators because the validation process is strictly related with the incident handling. Thus, every PSAP element needs to check and validate the new blocks for possible related incidents.

Figure 2:
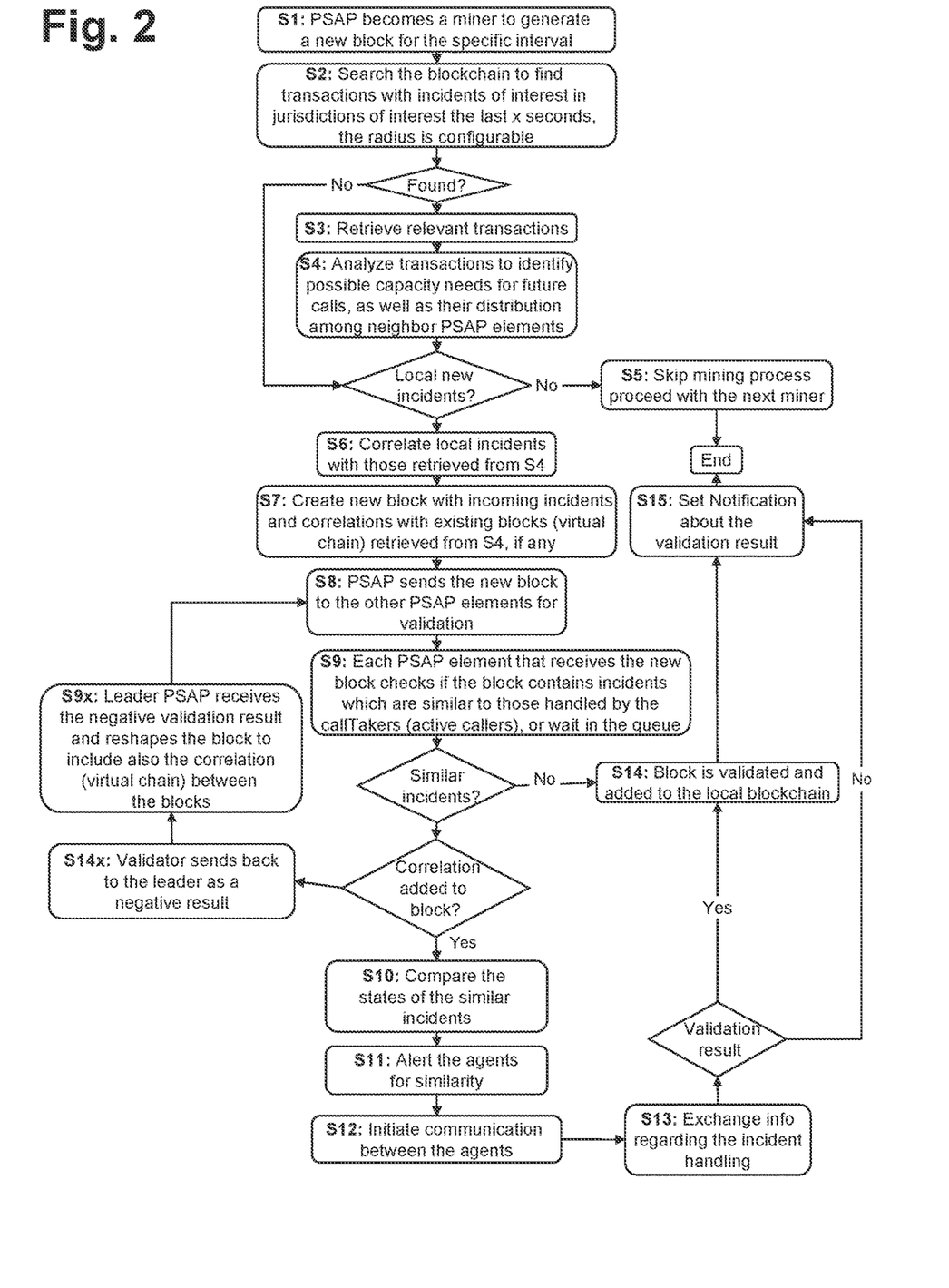
FIG. 2 shows a block diagram of the method for blockchain-driven communication using encapsulated virtual chains according to another embodiment of the invention.

In FIG. 2 a flowchart of an embodiment of the method is depicted regarding an emergency architecture. In step S1 a node among the different primary PSAP elements becomes a leader node, in general the one node that at this specific predetermined time period t mines or creates a new block.

In the next step S2, the leader PSAP node (miner), performs a search in the blockchain to find similar incidents to those which are waiting on the leader PSAP queue, or are actively handled, or have already been transferred to the secondary PSAP element which is related to the leader node. This is the time period between the point when the last block was validated (this explains the need to search the blockchain) and the current interval where the PSAP becomes a leader node. In this time interval, it is assumed that new calls may have appeared on the leader PSAP, or in general to any other PSAP element in the network. The search is quite targeted, in the sense that each PSAP element can configure for which jurisdictions it wants to search the blockchain. This way, it is more like a targeted geolocation-based search, but other approaches can also be exploited. For example, a PSAP could select to query for transactions generated only from neighbor PSAP elements, or from all the different PSAP elements which participate in the blockchain.

If the transactions are found, then in step S3 the PSAP element retrieves the transactions and in step S4 performs analysis of the transactions. This step could for example include that, if one or more of the neighbor PSAP elements receives many transactions, then the leader PSAP element may want to perform resource check with respect to the capacity, or prepare the resources (e.g. predict what will happen regarding the incident handling), either on the primary, or the secondary PSAP, or even on the first responders end.

In step S5 the leader node checks for new incidents, in case no new incidents are found, the block mining/creation process is ended, and the method proceeds with a new leader node.

However, if, after the analysis of the blocks, the leader PSAP finds similar incidents, in step S6 it correlates the incidents with those that have lately arrived on the leader PSAP element, those incidents from the last block which was generated till the current interval.

In step S7 the leader PSAP element creates a new block with all the information described above, plus any possible relations that afterwards will be used from other nodes— PSAP elements, in order to traverse the virtual chains in an efficient and targeted manner, so as to visualize or just track the history and block generation of specific incidents.

In step S8 the primary PSAP sends the block to the rest of the PSAP elements for validation.

In step S9 each validator PSAP that receives the block checks if it contains similar incidents to those waiting in the validators queue or which are probably active—answered by the agents of the PSAPs. For the similarity check, different pieces of data can be used, for example the correlation can be performed based on the geolocation, the source of the call, the stream details etc.

After that, one more check is performed whether the correlation has been added on the examined block. If the correlation is not included, then in step S14X the method instructs the validator PSAP to return a bad validation result to the leader PSAP node. However, this process cannot be repeated continuously, because this way it may end up in an endless loop. Thus, it is wise either to let the leader PSAP try for a predetermined number of times, or to just proceed with the next leader PSAP. If the second approach is selected, the validator will need to include the correlation among the different blocks in a future timeframe, when it will be assigned the leading role.

Each PSAP element that receives the new block checks if the block contains incidents which are similar to those handled by the callTakers (active callers, agents) or which wait in the queue, and eventually the new block is validated and added to the local blockchain in step S14, if a positive validation result is achieved. Further, in step S15 all nodes are notified about the validation result.

However, in case there are similar incidents present among other PSAP nodes of the blockchain, the validator in step S14x sends a negative validation result to the leader PSAP, in case the correlation was not added to the block. In step S9X, the leader PSAP node receives the negative validation result and reshapes the block. After that, the method continues at step S8.

In case similar incidents are found and the correlation is including in the block, in step S10 a correlation is performed regarding the handling state of the incidents. For example, one of the incidents may be still waiting on the queue on the leader PSAP element, while the related call on the validator PSAP element may have been already transferred to the secondary PSAP.

In step S11 the agents of the PSAPs concerned are alerted for the similarity. The correlation may be between more than one PSAP element and the leader PSAP. The alerting could be triggered for example by using a popup window or a button on the emergency management application side.

After the agents see the alerting, in step S12 a communication is tried to initiate between them, in order to identify if these incidents are related. In this case, a conference bridge can be created automatically if the communication comprises more than two parties.

In case the communication is not possible, then the incidents are automatically marked as related. This is far more useful than ignoring, or better not marking the relevant incidents as correlated.

In step S13 the agents exchange information regarding the incident handling. For example, details related to the PSAP elements that will dispatch the incident etc. can be conveyed to perform only one selective transfer to the secondary PSAP etc.

If the validation result is positive from the validator PSAP, then, as already mentioned in step S14, the block is added on the local blockchain ledger, and all nodes are notified about the validation results according to step S15.

In essence, an increased dispersion of the calls for the same incident among different PSAP elements is not to be expected. Thus, steps S14X and S9X may be repeated a few times inside an interval but in the worst case it is quite predictable that it will not scale too much to cause delays or other issues. In order not to repeat the steps, another approach would be just to block for a few seconds in S9X so as to assure that more than one negative response may arrive on the leader node.

As already mentioned, validating a block on the blockchain means that a node, in general, or the leader node in the POA environment, will generate a new block and will send the block to the other nodes for validation. Except from the other requirements for validation in a blockchain, say for example the merkle tree validation, this validation is extended including also the concept of context validation in this particular case incident validation.

To end this, if a validation node (e.g. PSAP element) receives a block that includes context (incidents) for validation, then it will check if the context (incidents) included in the new block fulfil the correlation requirements with the ones currently handled on the validation node (PSAP).

Additionally, if a correlation is found, then the leader node (PSAP) will include the relation between the blocks on the transaction that will be included in the newly generated block. In order to do that, the new block will have to be generated again and sent back to the validators (PSAPs) including also this piece of information.

In a different approach, only the validator node could add the relation to a next block, when the validator will become a leader node in a next time interval. With this approach, e.g. only the validator node is able to include the relation between the content (incidents), then it is not sure when and if this node will become a new leader. With this approach each node does not delay the validation but sends a positive reply to the leader node and waits to add the correlated content when it will be assigned the leading role. This may apply, for example, in the case that many different validators delay the validating process and thus the mining round increases too much. This could be applied in case there are major incidents and the chance that different PSAP elements will receive incident-related calls augments proportionally.

Thus the first approach is more effective with respect to clarity, but it will introduce a small delay, in the sense that upon tracking a correlation between two contexts (incidents), this information will be included in the block in this specific timeframe-round of mining and it will be conveyed to the rest of the nodes fast enough in order to use the generated block, say in case they become leader nodes but they have relevance to the context (incident). But also, the validator node will keep the information in order to include the relation when it will be the time to become a leader node. Using this approach, a number of virtual chains are created inside only one chain. This means that the traversal of the chain is much faster.

Figure 3:
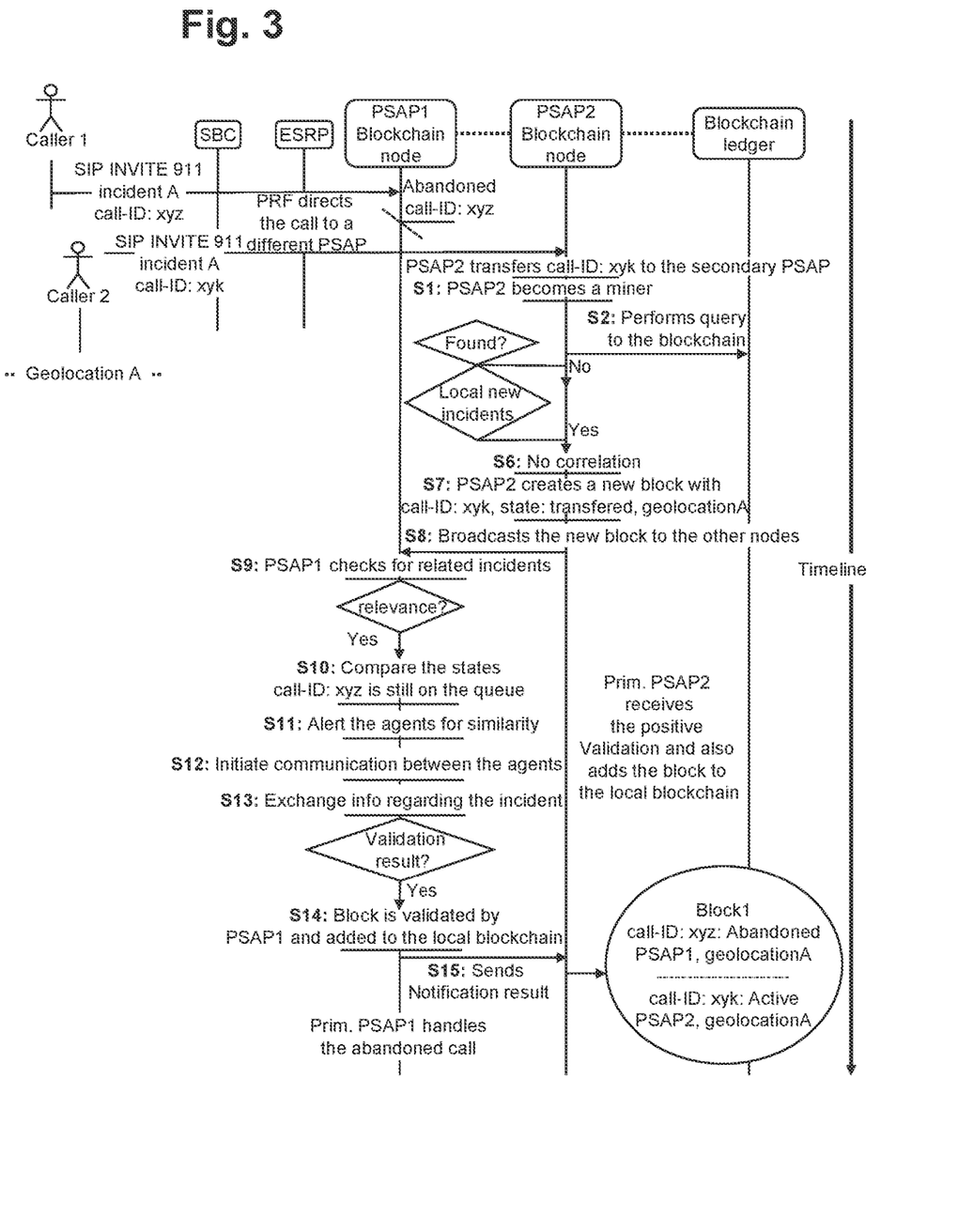
FIG. 3 shows a schematic illustration of the method for blockchain-driven communication using encapsulated virtual chains; here the blockchain does not contain past transactions-blocks according to another embodiment of the invention.

FIG. 3 shows a flowchart of an exemplary method. Here the Blockchain does not contain past transactions-blocks. In this embodiment, two callers (caller 1 and caller 2) call from the same geofence (e.g., the same geolocation), but their calls are routed on different PSAP elements. In step S1, PSAP2 becomes a leader node to mine/create a new block. In step S2, PSAP 2 performs a query to the blockchain in order to identify if there are related incidents related to the neighbor jurisdictions that may have been added on the blockchain. However, other related blocks are not found on the blockchain, and the method checks whether local incidents wait on the queue or if they are currently handled from the leader PSAP element (e.g. this comprises also the secondary PSAP element).

There are local incidents but, based on the results from step S2, no correlation, thus in step S6 there is no correlation between incidents. Only the local incidents exist on the leader node queue. In step S7, PSAP2 creates a new block with the call that came from caller 2. This call has a call-ID equal to xyk, it is related to incident A and comes from geolocation A. In step S8 the leader PSAP broadcasts the new block to the other nodes of the network, say the validators. In this case the PSAP1 is the only validator. Then, in step S9, PSAP1 performs a check in the block in order to identify if other incidents exist which are similar to local new incidents on the PSAP validator side. Similar incidents are found, and it is checked whether the correlation has been added to the block. It is assumed that the method identifies that the correlation has not been added because PSAP2 was not aware of the correlation at the initial phase of the block creation, and thus it executes steps S14X and S9X. After these steps are executed, the correlation is also included in the new block and in step S10 the validator PSAP1 checks the states of the related calls. As a result, call-ID: xyz on the PSAP1 seems to still be waiting in the PSAP queue as abandoned. In step S11 the agents/callTakers of the PSAPs are alerted for similarity. A communication path is initiated between the two callTakers according to step S12.

In step S13 the agents exchange information regarding the incident handling. The validation result is positive from PSAP1. Thus, according to step S14, the block is validated and is added into the local blockchain ledger. PSAP1 sends the positive result to PSAP2. Finally, PSAP2 also adds the block to the local ledger. After the method is executed, the abandoned call is handled in PSAP1.

Figure 4:
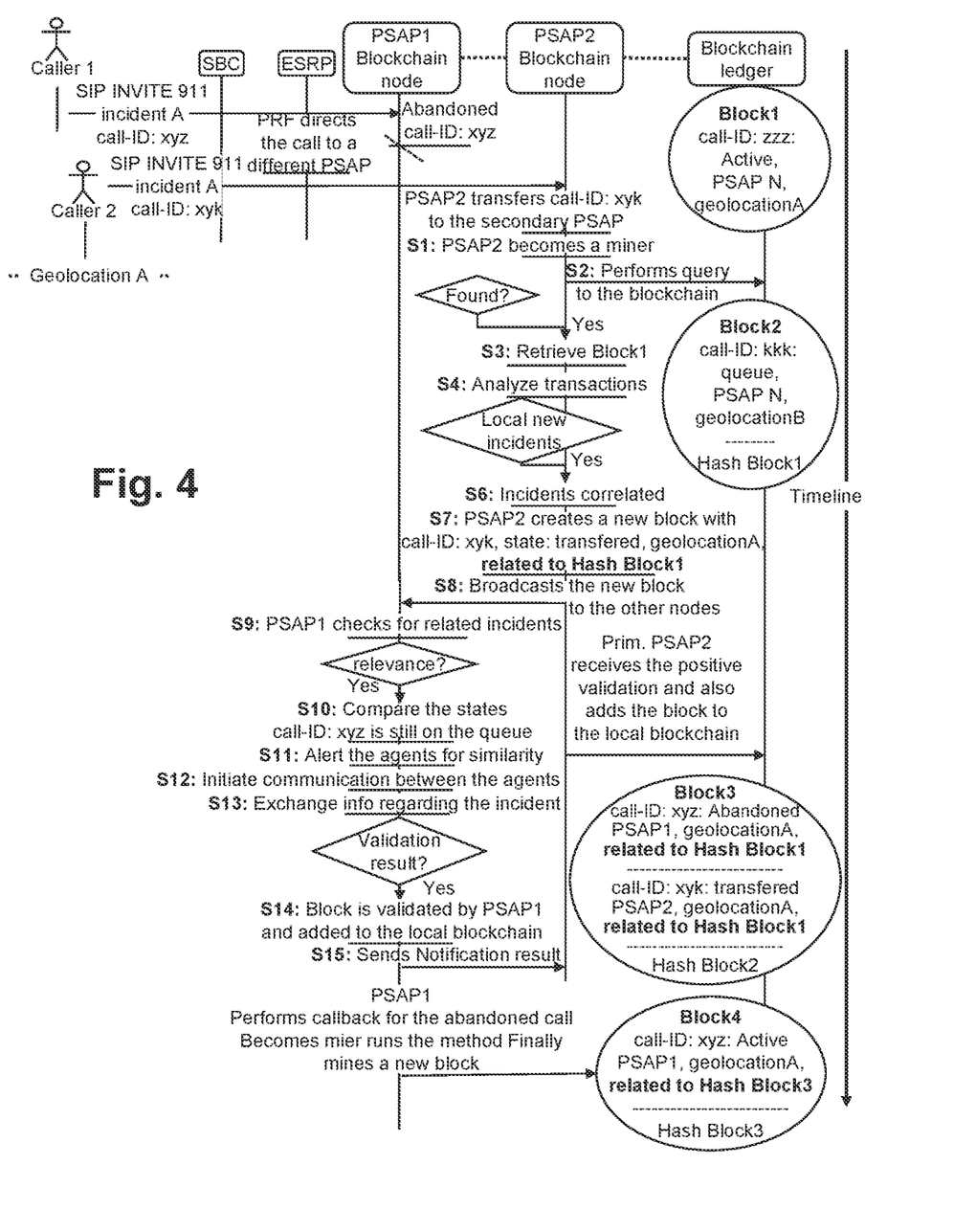
FIG. 4 shows a schematic illustration of the method for blockchain-driven communication using encapsulated virtual chains; here the blockchain does contain past transactions-blocks according to another embodiment of the invention.

FIG. 4 shows a flowchart of another exemplary method. Here the Blockchain contains past transactions—blocks. In this embodiment, the difference to the embodiment in FIG. 3 is that the blockchain already contains transactions that can be used in the first steps. Thus, in step S3 the leader PSAP2 node retrieves block1. In step S4, the transactions are analyzed. The incidents are correlated and in step S7, PSAP 2 creates a new block which includes the call that is handled by this PSAP element, say the call with call-ID: xyk, and also includes in this block the relation with block1. This information is related to the correlation with the hash value of the previous block which is something standard in the blockchain architecture. The rest of the method steps are same as for the embodiment according to FIG. 3, except from the fact that when PSAP1 handles the abandoned call and finally mines/creates a new block that includes call-ID: xyz, then it also includes in the relevant transaction the correlation details with block3 and block1.

The previous generated blocks can be used later by other PSAP elements in the same blockchain, in a way that each PSAP can query and check which other PSAP elements have already handled similar calls. For example, this could be used in order to direct an agent which other PSAPs to contact directly for similar calls. For example, in this case the agent is not in position to know where he/she should be directed in order to get more information for an incident. By checking the relevance of the calls in the blockchain, the agent is in position to retrieve past generated blocks or, in general, a different virtual chain which contains the details of the geolocations of calls and the PSAP elements that handled those incidents.

Figure 5:
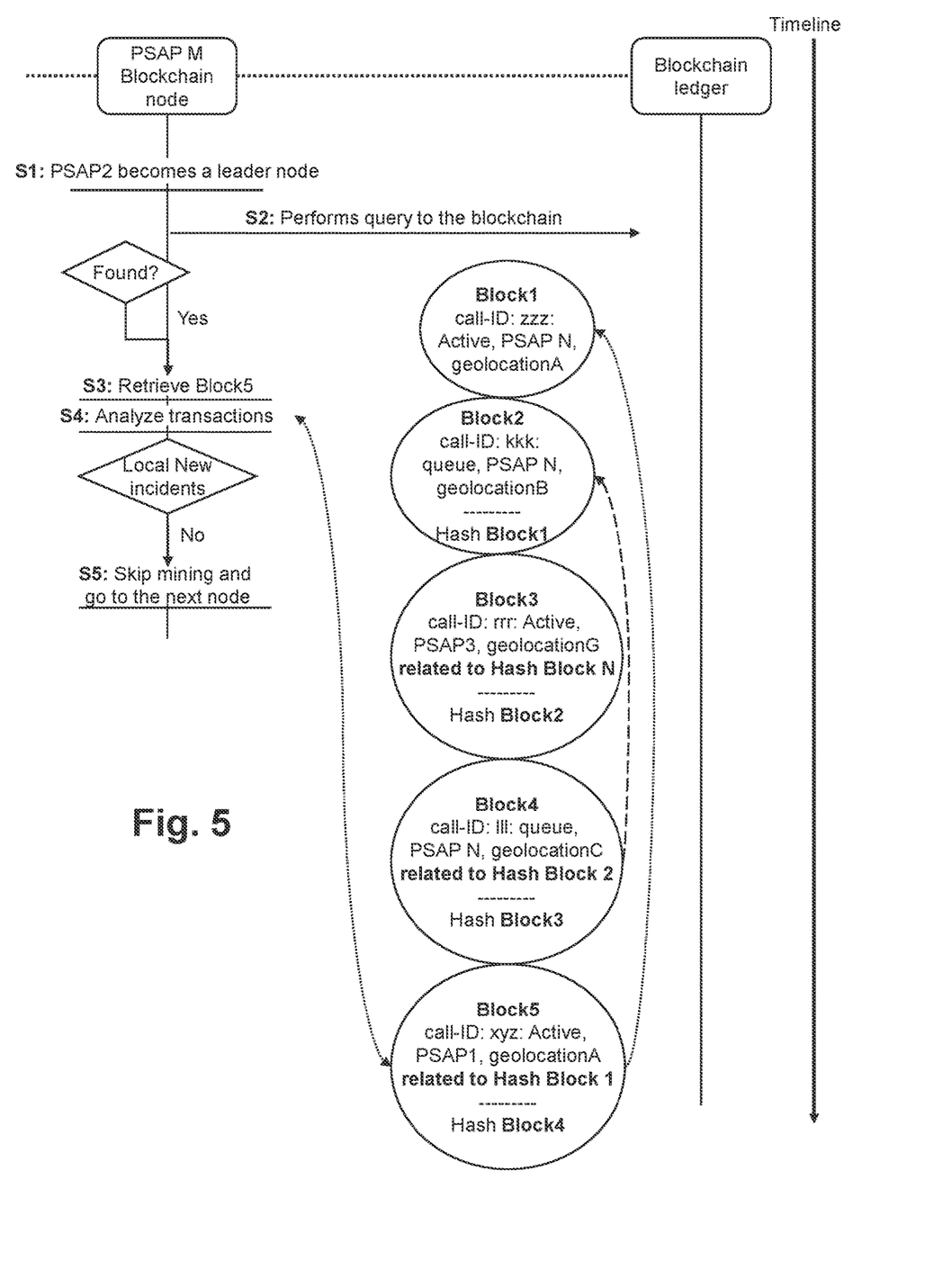
FIG. 5 shows a schematic illustration exemplifying the advantages of the virtual chain of the method for blockchain-driven communication using encapsulated virtual chains according to another embodiment of the invention.

FIG. 5 shows in a flowchart the advantages of the virtual chain. FIG. 5 offers an overview of the embodiment according to FIG. 4. The two different arrows-lines, marked with dots and dashes, accordingly, depict the relations of the two different virtual chains which are encapsulated in the original ledger. The agents are in position to follow—in essence to efficiently jump between past validated blocks—only by exploiting the specific virtual chains, formed by the context-related blocks. For example, the method in step S3 retrieves Block4, which is already bonded with Block1. Thus, the validating PSAP element does not need to search more in the existing blocks because the previous validation and mining/creating rounds have already the necessary correlation between the blocks. This holds true also for the pair of blocks 4 and 2. This approach can be applied to any number of blocks.

It should be noted that the term "comprising" does not exclude other elements or steps and the "a" or "an" does not exclude a plurality. Further, elements described in association with different embodiments may be combined.

It should also be noted that reference signs in the claims shall not be construed as limiting the scope of the claims.

It should also be appreciated that different embodiments of the method, communication system, and communication apparatus can be developed to meet different sets of design criteria. For example, the particular type of network connection, server configuration or client configuration for a device for use in embodiments of the method can be adapted to account for different sets of design criteria. As yet another example, it is contemplated that a particular feature described, either individually or as part of an embodiment, can be combined with other individually described features, or parts of other embodiments. The elements and acts of the various embodiments described herein can therefore be combined to provide further embodiments. Thus, while certain exemplary embodiments of a telecommunication apparatus, PSAP elements, ESRPs, ESInet elements, ESInets, a telecommunication device, terminal device, a network, a server, a communication system, and methods of making and using the same have been shown and described above, it is to be distinctly understood that the invention is not limited thereto but may be otherwise variously embodied and practiced within the scope of the following claims.

What is claimed is:

1. A method for blockchain-driven communication using encapsulated virtual chains, comprising:
    determining, by a consensus scheme, a node as a leader node which is able to create a new block within a specific predetermined time period t, the leader node comprising a computer device having a processor connected to a non-transitory computer readable medium;
    performing, by the leader node, a search in the blockchain to find a transaction of a block with context to an incident also present at the leader node, wherein context comprises a piece of information referring to an incident;
    retrieving, by the leader node, the transaction found in the search;
    performing, by the leader node, an analysis of the retrieved transaction to identify possible predict capacity needs for future tasks related to this context and distribution of the future tasks among neighbor nodes; and
    checking, by the leader node, whether new local context is present at the leader node, and, in case no new local context is found, ending the block creation process of the leader node and repeating execution of the method by determining another node as a leader node.

2. The method according to claim 1, wherein when the new local context is found during the checking, the method also comprises:
    correlating, by the leader node, the new local context with that context analyzed in the performing of the analysis of the retrieved transaction;
    creating, by the leader node, a new block comprising the new local context together with the correlations of existing blocks identified in the performing of the analysis of the retrieved transaction;
    sending, by the leader node, the created new block to the other nodes of the blockchain for validation;

checking, by each of the other nodes of the blockchain, whether the created block comprises context to an incident to that which is handled by one of the other nodes of the blockchain;

validating, by the other nodes, the created new block and adding the created new block to the blockchain, in case there is no context to an incident also present among the other nodes of the blockchain; and sending, by the leader node, a notification about the validation result to the other nodes.

3. The method of claim 2, wherein there is context to an incident also present among at least one of the other nodes of the blockchain, and the method also comprises:

sending, by the at least one other node of the blockchain which exhibits context to an incident also present among at least one of the other nodes of the blockchain, a negative validation result to the leader node in case this correlation was not added to the created new block; and receiving, by the leader node, the negative validation result and reshaping, by the leader node, the created new block to comprise also the correlation between the blocks, then sending, by the leader node, the reshaped created new block to the other nodes of the blockchain for validation.

4. The method of claim 3, wherein context to an incident also present among at least one of the other nodes of the blockchain is found and the correlation has been added in the reshaped created new block, the method further comprising:

comparing, by the leader node, the states of the context;

alerting, by the leader node, nodes with context to an incident also present among at least one of the other nodes of the blockchain, for similarity-in context;

initializing, by the leader node, a communication between the nodes with context to an incident also present among at least one of the other nodes of the blockchain;

exchanging, by the nodes with context to an incident also present among at least one of the other nodes of the blockchain, information regarding context handling;

validating, by the other nodes, the created block and adding the created block to the blockchain, if the validation result is positive; and sending, by the leader node, a notification about the validation result to the other nodes.

5. The method of claim 3, further comprises;

marking, by the leader node or any other node or validator, the similar context automatically as related, in case the communication is not possible between the nodes with context to an incident also present among at least one of the other nodes of the blockchain.

6. The method of claim 1, wherein the node and the leader node of the blockchain is one or more of a Public Safety Answering Point (PSAP) element, a computer, a server, or an element of an entity of critical infrastructure.

7. The method of claim 1, wherein the analysis of the retrieved transactions to identify possible predict capacity needs for future tasks related to this context and distribution of the future tasks among neighbor nodes identifies one or more of the neighbor nodes receiving multiple transactions that exceed or meet a pre-defined threshold, the method further comprising:

performing, by the leader node, a resource check with respect to the capacity, and preparing the resources needed on a primary PSAP, a secondary PSAP, and/or on a first responders' end.

8. The method of claim 1, wherein the blockchain is a Public blockchain, a Private blockchain, a Consortium blockchain or a hybrid blockchain.

9. The method of claim 1, wherein the predetermined time period t is 30 seconds, 22 seconds or 15 seconds.

10. A system for blockchain-driven communication using encapsulated virtual chains, comprising:

a leader node communicatively connectable to at least one other node, the leader node comprising a computer device having a processor connected to a non-transitory computer readable medium;

the leader node configured to:

create a new block of a blockchain within a specific predetermined time period t, perform a search in the blockchain to find a transaction of a block with context to an incident also present at the leader node, wherein context comprises a piece of information referring to an incident;

retrieve the transaction found in the search;

perform an analysis of the retrieved transaction to identify possible predict capacity needs for future tasks related to this context and/or distribution of the future tasks among neighbor nodes to which the leader node is connectable; and check whether new local context is present at the leader node, and, in case no new local context is found, ending the block creation process of the leader node to initiate selection of a new leader node.

11. The system according to claim 10, wherein the at least one other node comprises: one or more nodes connected to each other within a blockchain system having a blockchain that includes one or more transactions, one or more blocks capable of keeping a set of transactions which is distributed to all nodes in the network, a chain of blocks in a specific order, and/or one or more virtual chain which are chained by their context and are encapsulated in the chain, the at least one other nodes including one or more validator nodes.

12. The system of claim 11, the at least one other node comprising one or more nodes configured to implement at least one pre-defined consensus algorithm.

13. The system according to claim 12, wherein the at least one pre-defined consensus algorithm is one or more of proof of authority (PoAuth), proof of stake (POS), delegated proof of stake (DPOS), leased proof of stake (LPoS), proof of elapsed time (PoET), practical Byzantine fault tolerance (PBFT), simplified Byzantine fault tolerance (SBFT), delegated Byzantine fault tolerance (DBFT), directed acyclic graphs (DAG), proof of activity (PoA), proof of importance (PoI), proof of capacity (PoC), proof of burn (PoB), multi-signature and/or proof of weight (PoWeight).

14. The system according to claim 10, wherein the system comprises a Master Node.

* * * * *